US012673599B2

(12) United States Patent

Meszmer et al.

(10) Patent No.: US 12,673,599 B2

(45) Date of Patent: Jul. 7, 2026

(54) FOLDING TABLE SYSTEM FOR A VEHICLE SEAT, METHOD FOR POSITIONING A PASSENGER MODULE AND VEHICLE-OCCUPANT PROTECTION SYSTEM HAVING A FOLDING TABLE SYSTEM

(71) Applicant: ZF AUTOMOTIVE GERMANY GMBH, Alfdorf (DE)

(72) Inventors: Simon Meszmer, Mittelbiberach (DE);
Nils Heider, Brunsbek (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 262 days.

(21) Appl. No.: 18/689,608

(22) PCT Filed: Sep. 6, 2022

(86) PCT No.: PCT/EP2022/074758

§ 371 (c)(1),
(2) Date: Mar. 6, 2024

(87) PCT Pub. No.: WO2023/036781

PCT Pub. Date: Mar. 16, 2023

(65) Prior Publication Data

US 2025/0121759 A1 Apr. 17, 2025

(30) Foreign Application Priority Data

Sep. 7, 2021 (DE) ..................... 10 2021 123 144.2

(51) Int. Cl.
B60N 3/00 (2006.01)
B60N 2/75 (2018.01)
(Continued)

(52) U.S. Cl.
CPC ............. B60N 3/002 (2013.01); B60N 2/767 (2018.02); B60N 2/773 (2018.02); B60N 2/79 (2018.02);
(Continued)

(58) Field of Classification Search
CPC ........ B60N 3/002; B60N 2/767; B60N 2/773; B60N 2/79; B60R 11/0235; B60R 2011/0005
(Continued)

(56) References Cited

U.S. PATENT DOCUMENTS

| 10,232,815 | B1 | 3/2019 | Dry et al. |
| 10,647,264 | B2 | 5/2020 | Forsgren et al. |
| 2023/0052066 | A1* | 2/2023 | Basu ..................... B60R 21/013 |

FOREIGN PATENT DOCUMENTS

| DE | 102019105603 A1 | 9/2020 |
| EP | 0958961 A2 | 11/1999 |
| JP | 2009208566 A | 9/2009 |

OTHER PUBLICATIONS

PCT International Search Report for corresponding International Application Serial No. PCT/EP2022/074758, mailed Dec. 23, 2022, pp. 1-4.

* cited by examiner

*Primary Examiner* — Steven O Douglas

(74) *Attorney, Agent, or Firm* — Tarolli, Sundheim, Covell & Tummino LLP

(57) ABSTRACT

A hinged table system (10) for a vehicle seat (12) includes an adjustable holder (18) arranged on the instrument panel (20), a support device (16) mounted on the vehicle seat (12), and a passenger module (14) comprising an airbag and a tabletop including a multimedia panel, wherein the airbag is in fluid communication with an inflator so that the inflator can inflate the airbag. Furthermore, the invention relates to
(Continued)

a method of positioning a passenger module (14) of the hinged table system (10).

14 Claims, 14 Drawing Sheets

(51) Int. Cl.
  *B60R 11/02*           (2006.01)
  *B60R 11/00*           (2006.01)
(52) U.S. Cl.
  CPC ...  *B60R 11/0235* (2013.01); *B60R 2011/0005*
                                    (2013.01)
(58) Field of Classification Search
  USPC ........................................................ 296/35.2
  See application file for complete search history.

FOLDING TABLE SYSTEM FOR A VEHICLE SEAT, METHOD FOR POSITIONING A PASSENGER MODULE AND VEHICLE-OCCUPANT PROTECTION SYSTEM HAVING A FOLDING TABLE SYSTEM

RELATED APPLICATIONS

This application is a U.S. National Stage Application filed under 35 USC 371, claiming priority to Serial No. PCT/EP2022/074758, filed on 6 Sep. 2022; which claims priority from Patent Application 10 2021 123 144.2, filed 7 Sep. 2021, the entireties of which are hereby incorporated herein by reference.

TECHNICAL FIELD

The invention relates to a hinged table system for a vehicle seat, comprising an adjustable holder arranged on the instrument panel, a support device mounted on the vehicle seat, and comprising a passenger module which comprises at least an airbag and a tabletop including a multimedia panel.

BACKGROUND

Further, the invention relates to a method of positioning a passenger module of the hinged table system as well as to a vehicle occupant protection system comprising a hinged table system.

For future vehicles, airbag modules including an airbag and an inflator which improve the protective effect for the vehicle occupant in a case of restraint are planned on the tabletop as part of a vehicle occupant protection system.

It is the drawback of the known hinged table systems that they may require a high force for manual adjustment due to the additional mass of the airbag modules. Known fully automatic hinged table systems include a complex adjusting mechanism. Moreover, the passenger modules of the known systems are placed in a rest position so that they cannot fulfil any further function, as they are stored beneath the vehicle seat, for example.

SUMMARY

Therefore, it is the object of the invention to provide a hinged table system which includes a simple and easy-to-operate adjusting mechanism.

The object is achieved by a hinged table system for a vehicle seat comprising an adjustable holder arranged on the instrument panel, a support device mounted on the vehicle seat, and a passenger module which comprises at least an airbag and a tabletop including a multimedia panel, the airbag being in fluid communication with an inflator so that the inflator can inflate the airbag. In a rest position, the passenger module is coupled to the holder on the instrument panel. The support device on the vehicle seat includes a support arm having a coupling section to which the passenger module can be coupled, wherein the passenger module can be adjusted between a rest position on the instrument panel and an operating position on the vehicle seat. It was found that such a hinged table system provides a simple adjusting mechanism which, when operated manually, requires only a low force but can also be operated fully automatically in a simple manner. In addition, the passenger module in the rest position is placed so that it fulfils a function for the vehicle seat occupant, such as an impact protection function.

Preferably, a drive is provided for fully automatically transferring the passenger module from the holder to the support device, and vice versa. The drive can be used to operate the hinged table system fully automatically and electrically in a simple manner.

In one embodiment of the invention, the holder includes an extendable telescopic arm by which the passenger module can be transferred to the support device. This helps achieve a particularly compact design.

In another embodiment of the invention, the holder includes an adjustable lever or scissor arm by which the passenger module can be transferred to the support device. This helps provide a simple and cost-efficient holder.

The passenger module may be provided to be releasably coupled to the coupling section via a locking device. In this way, the passenger module can be connected safely and easily to the support device.

In one embodiment, the passenger module includes an emergency release button which, when activated, releases the coupling established by the locking device. In this way, the locking can be released even manually in a simple and quick manner by pressing a button.

It may be provided that the support device is mounted pivotably on the vehicle seat and/or the support arm is designed to be extendable. Thus, a compact support device is provided which, in the rest position, can be swiveled away so that it does not disturb the vehicle seat occupant.

In one embodiment, the passenger module includes at least two sensors which measure the distance of the passenger module from a vehicle seat occupant. As a result, in the case of fully automatic adjustment, the optimum position of the passenger module relative to the vehicle seat occupant can be determined and set.

The tabletop of the passenger module can be provided to have a hinged design, wherein the tabletop in the rest position is located at the instrument panel in an opened or closed state, and the multimedia panel is arranged so that the vehicle seat occupant can use it as a screen. The passenger module in the rest position can thus permanently fulfil a function for the vehicle seat occupant, by providing, e.g., driving information via the multimedia panel.

In one embodiment of the invention, the hinged table system includes a drive so that the holder and the support device can be adjusted and aligned with each other fully automatically or semi-automatically. This can result in a particularly flexible adjusting operation and, where necessary, in fully automatic aligning, with the adjusting then being carried out manually, or vice versa. It is also conceivable that the complete adjusting operation is run fully automatically.

Further, the object is achieved by a method of positioning a passenger module of a hinged table system, comprising the steps of:

moving the holder including the passenger module coupled thereto from the rest position at the instrument panel toward the vehicle seat, coupling the passenger module to the coupling section of the support arm so that the passenger module is coupled to the support arm and to the holder, and releasing the coupling with the holder and returning the holder to the instrument panel.

In this way, a simple and quick adjusting operation is provided.

The method may be provided to comprise the further steps of:

measuring the distance of the passenger module from a vehicle seat occupant using at least two sensors, a first sensor determining the distance from the legs and a second sensor determining the distance from the abdomen of the vehicle seat occupant, and determining a preferred position of the passenger module based on the distance values measured, and adjusting the passenger module to said position.

In this manner, the passenger module can be adjusted fully automatically to the optimum operating and/or restraining position.

Another aspect of the invention provides that the method comprises the additional steps of: moving the holder from the instrument panel to the passenger module, coupling the holder to the passenger module, and releasing the coupling with the support arm, and moving the holder including the passenger module coupled thereto from the operating position at the vehicle seat to the rest position and pivoting the support arm from the operating position to the rest position.

Thus, the hinged table system can be adjusted simply and quickly from the operating position to the rest position.

The object is further achieved by a vehicle occupant protection system comprising at least a hinged table system according to the invention, a control unit and sensor elements to determine situations of restraint. The control unit is signal-connected at least to the inflator and the sensor elements. Preferably, the control unit is further connected to the sensors of the passenger module and, additionally, can also be connected to further elements to classify the vehicle seat occupant.

The control unit and the sensor elements for determining situations of restraint are suited, in a typical embodiment, to detect a pre-crash situation and, thus, to detect a situation of restraint upcoming with high probability.

If the control unit determines such a pre-crash situation using the data of the sensor elements, the passenger module is adjusted, through adjustment of the support device, from the operating position to a restraining position provided for restraining the vehicle seat occupant.

In the restraining position, the passenger module has a distance from the vehicle occupant in which the vehicle seat occupant is restrained most optimally by the airbags disposed in the passenger module.

The distance of the passenger module from the vehicle seat occupant is determined, during adjustment to the restraining position, preferably using the sensors of the passenger module.

For determining the distance of the passenger module from the vehicle seat occupant in the restraining position, a distance value can be predetermined. Alternatively, the control unit can determine the distance value of the passenger module from the vehicle seat occupant in the restraining position by means of the data of the elements for classifying the vehicle seat occupant, for example via a distance matrix deposited in the control unit.

BRIEF DESCRIPTION OF THE DRAWINGS

Further features and advantages of the invention will be evident from the following description and from the attached drawings which are referred to, and wherein.

4

Figure 3:
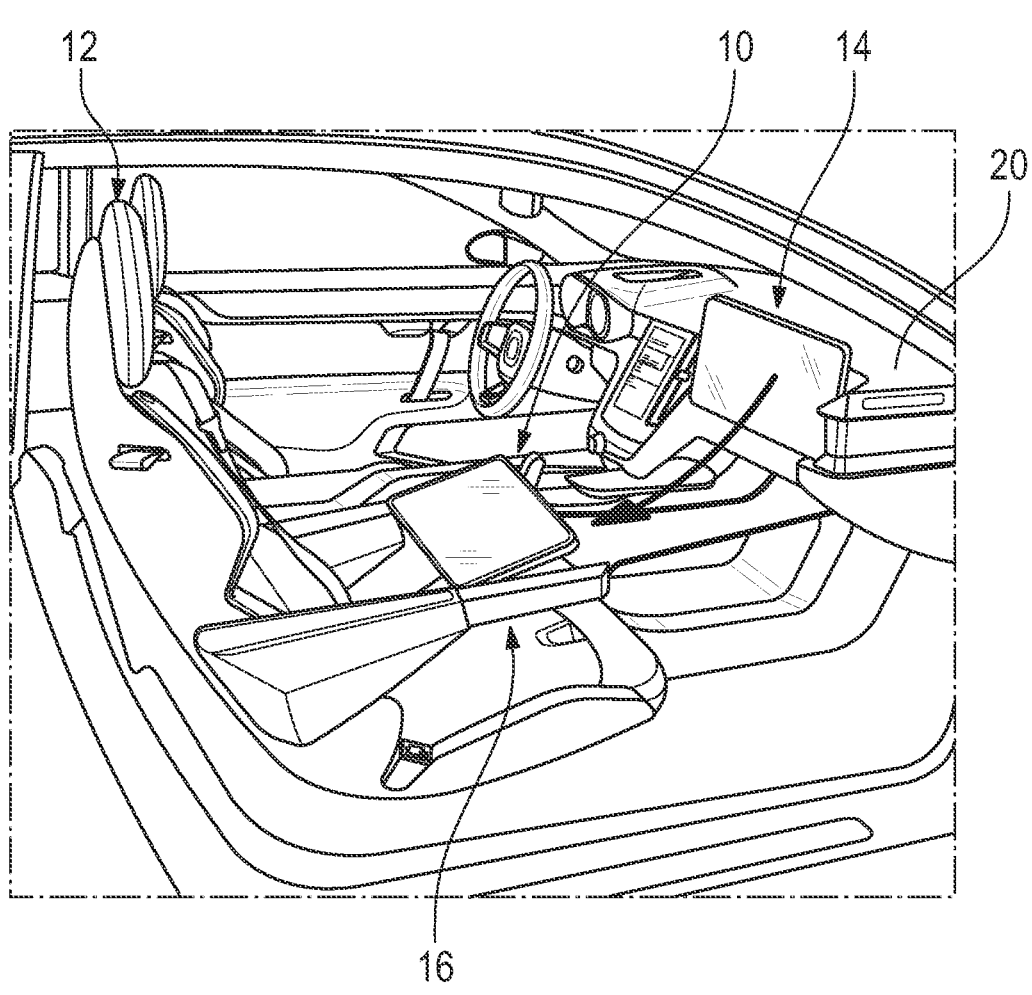
Figure 4:
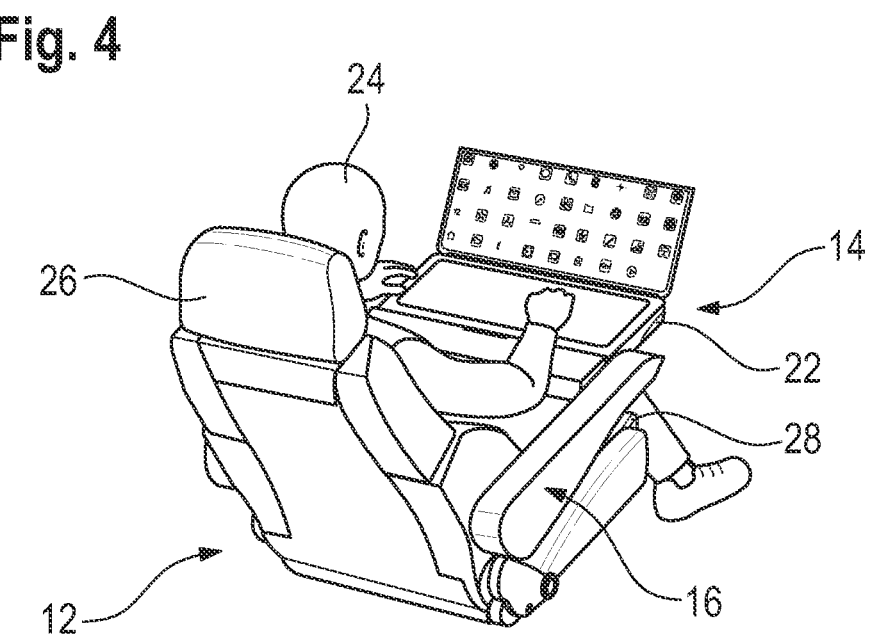
Figure 5:
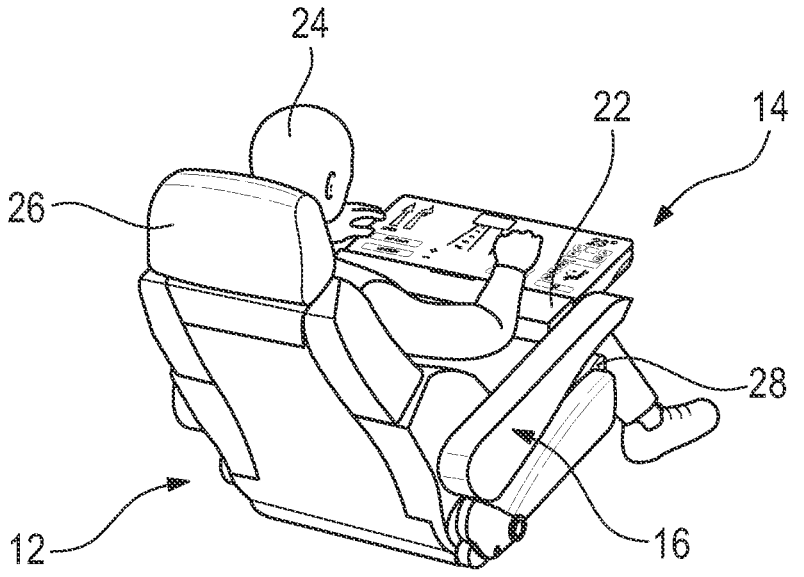
Figure 6:
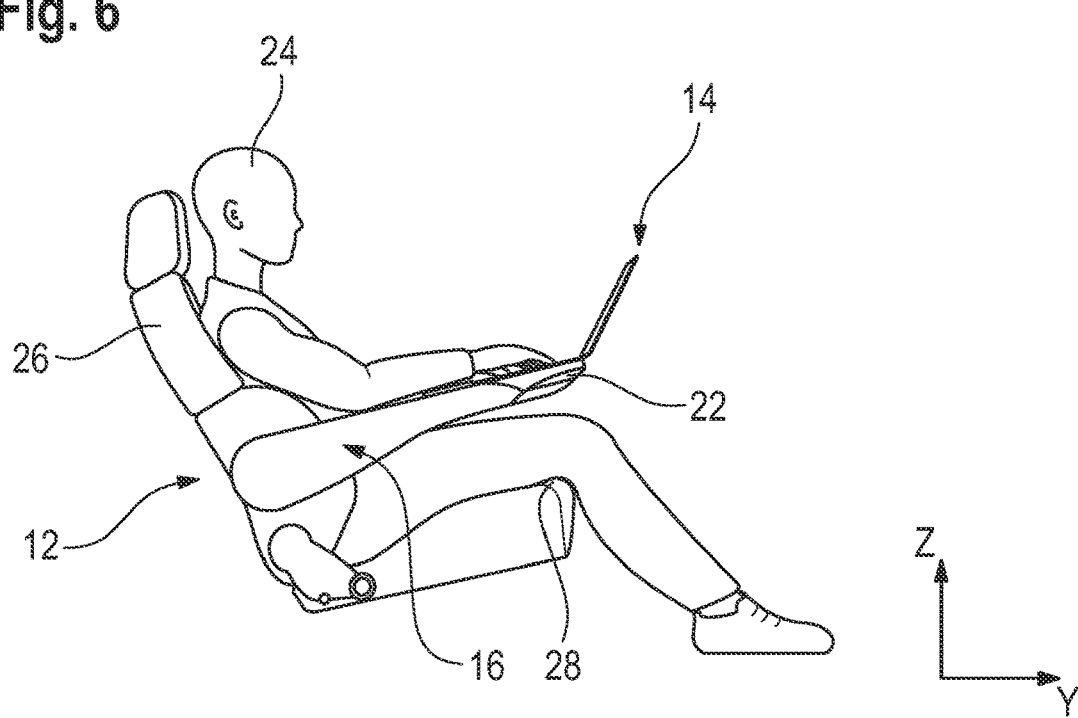
Figure 7:
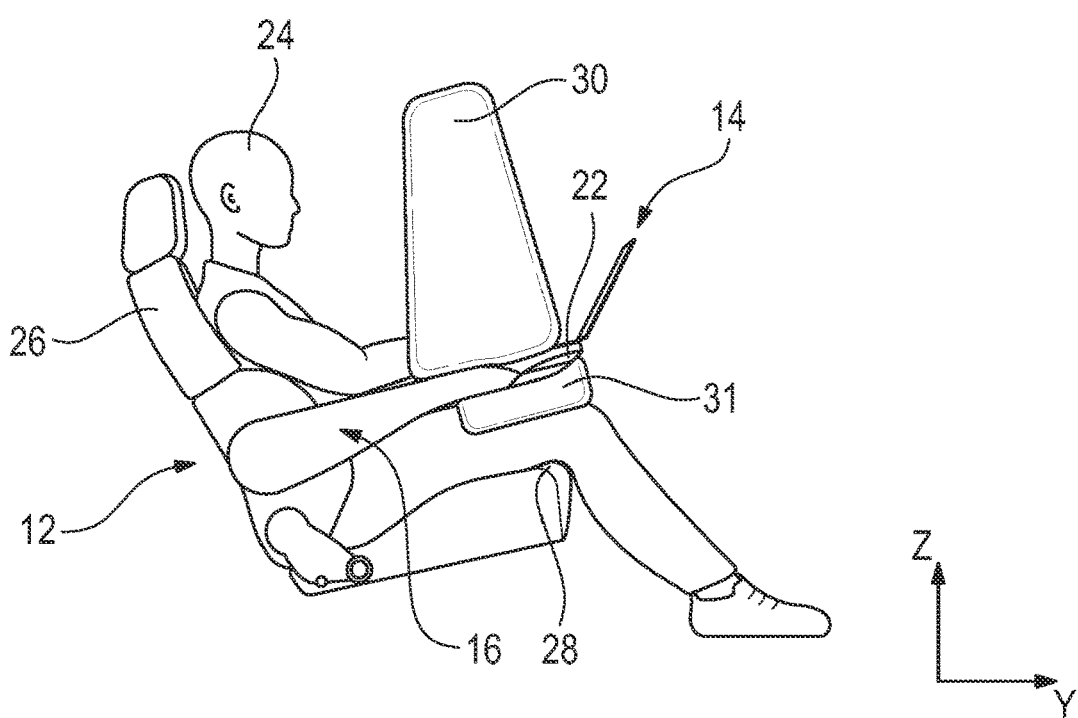
Figure 8:
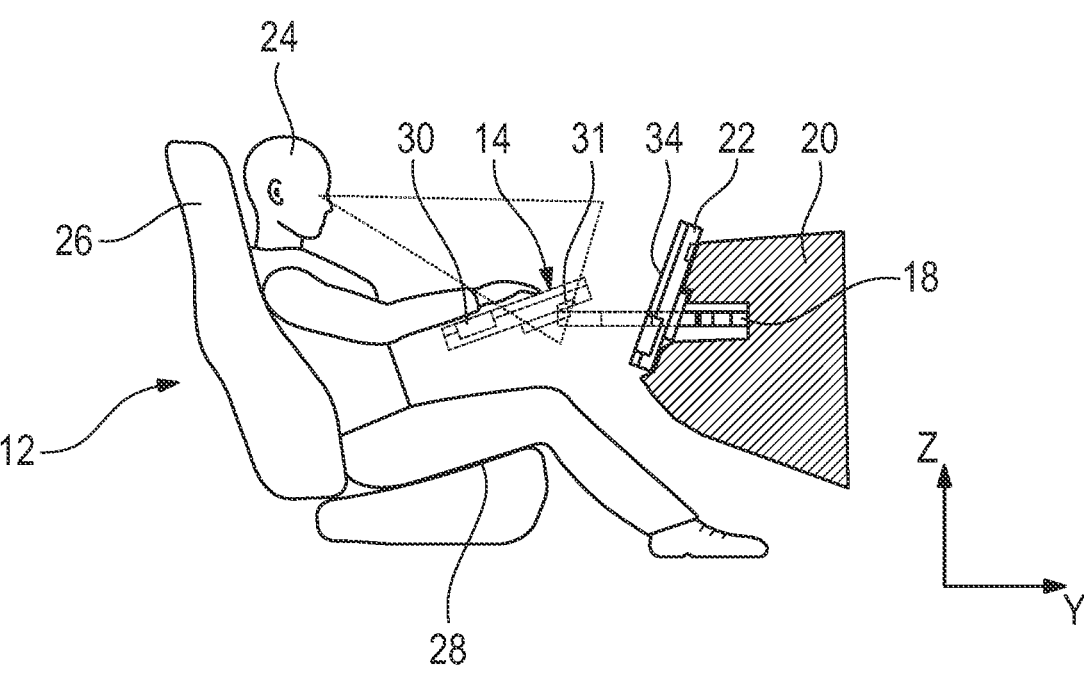
Figure 9:
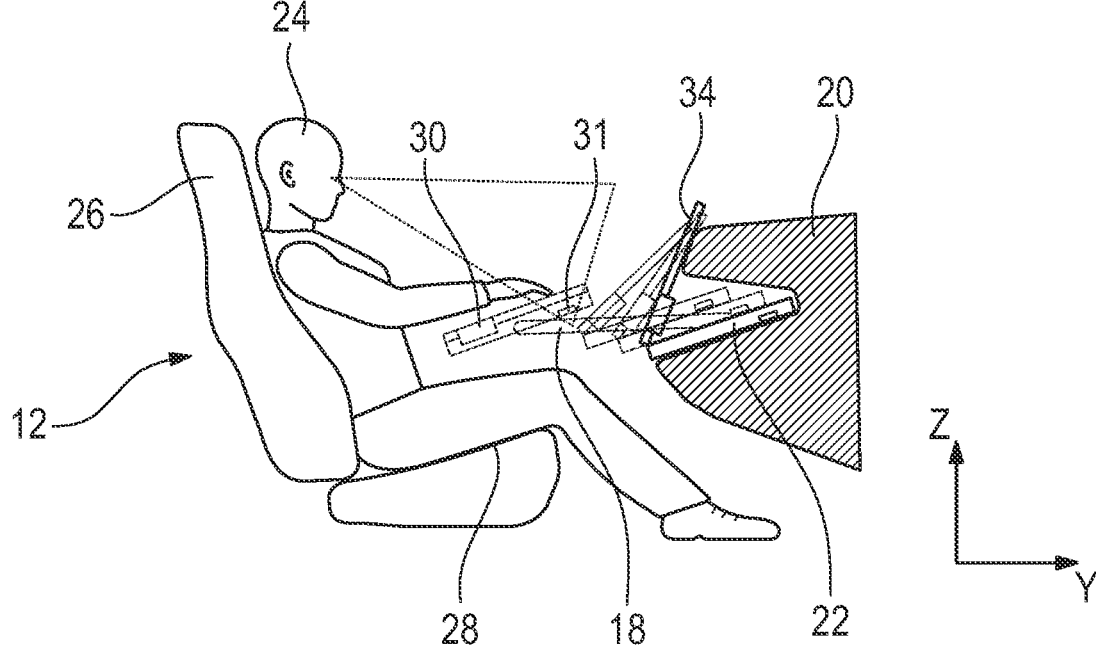
Figure 10:
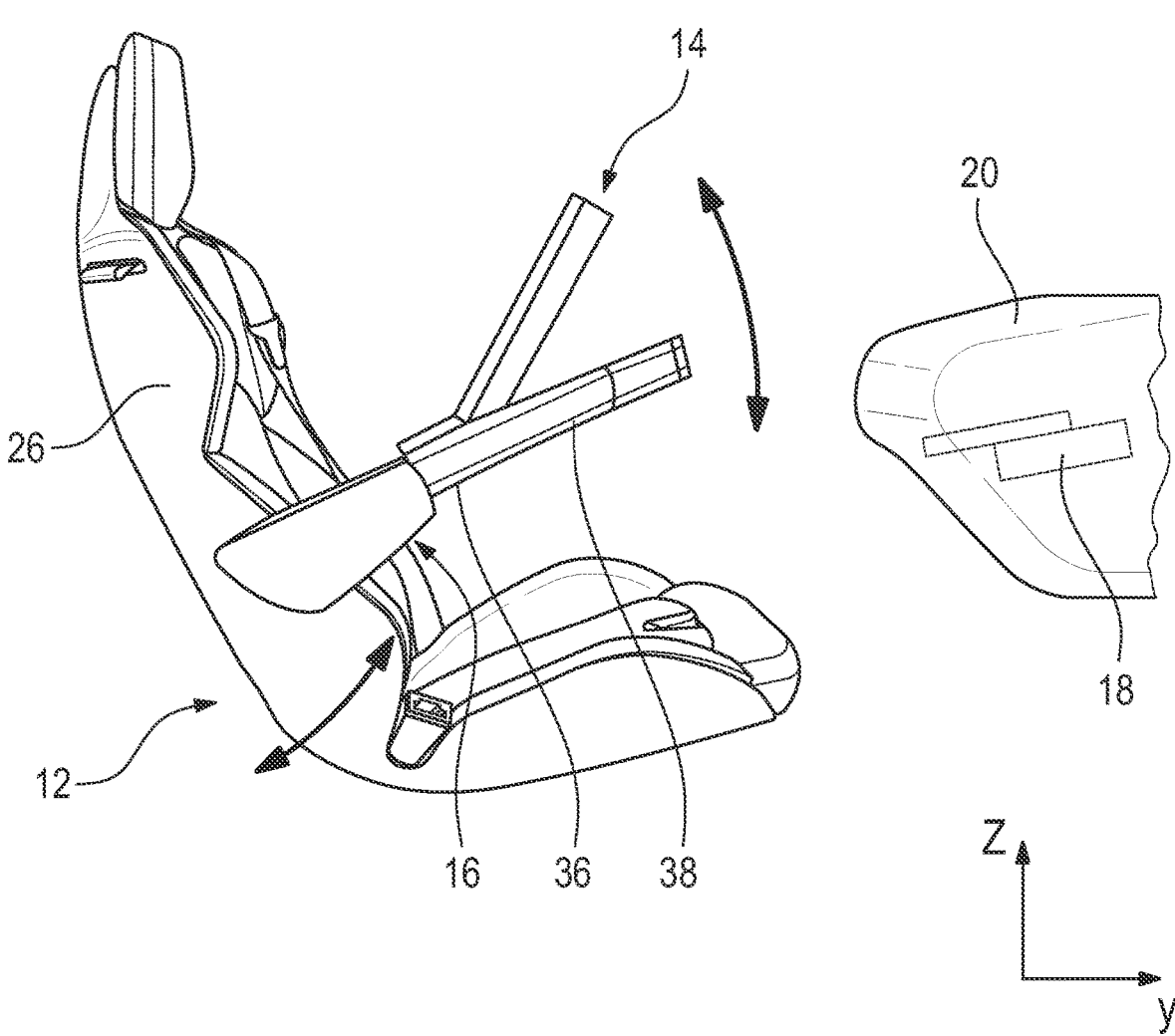
Figure 11:
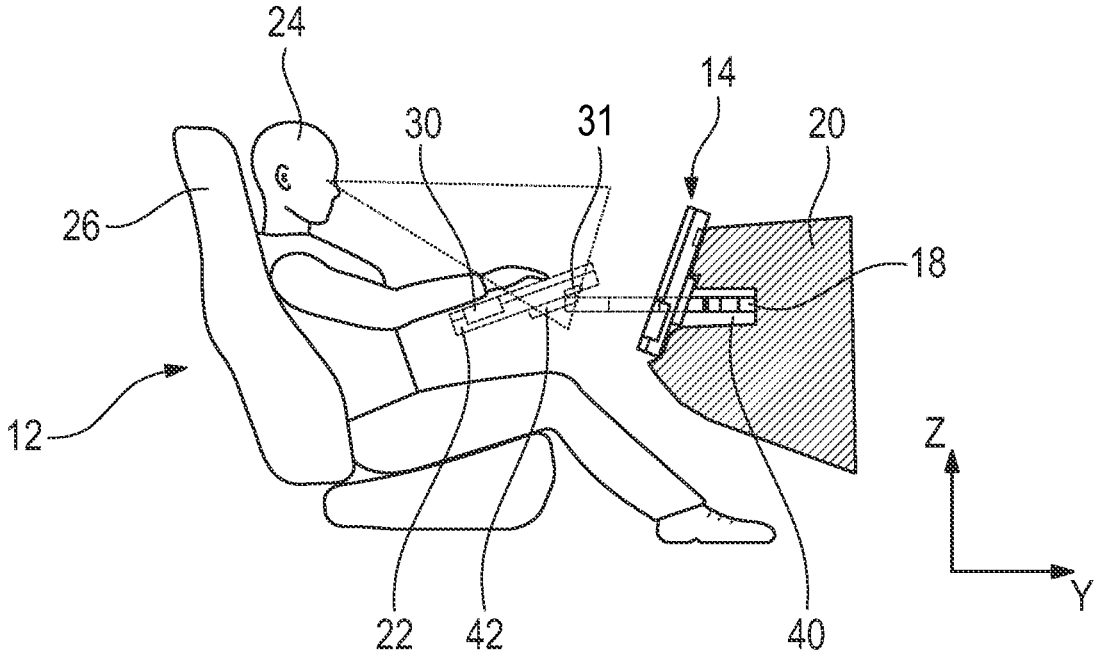
Figure 12:
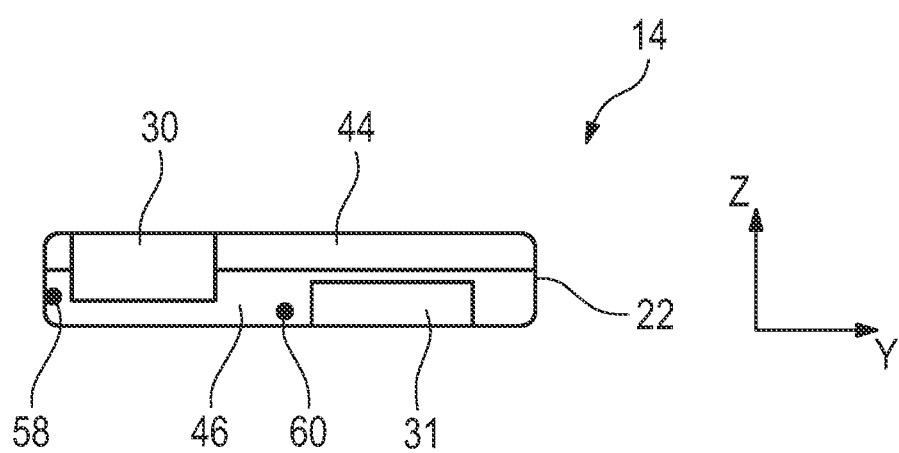
Figure 13:
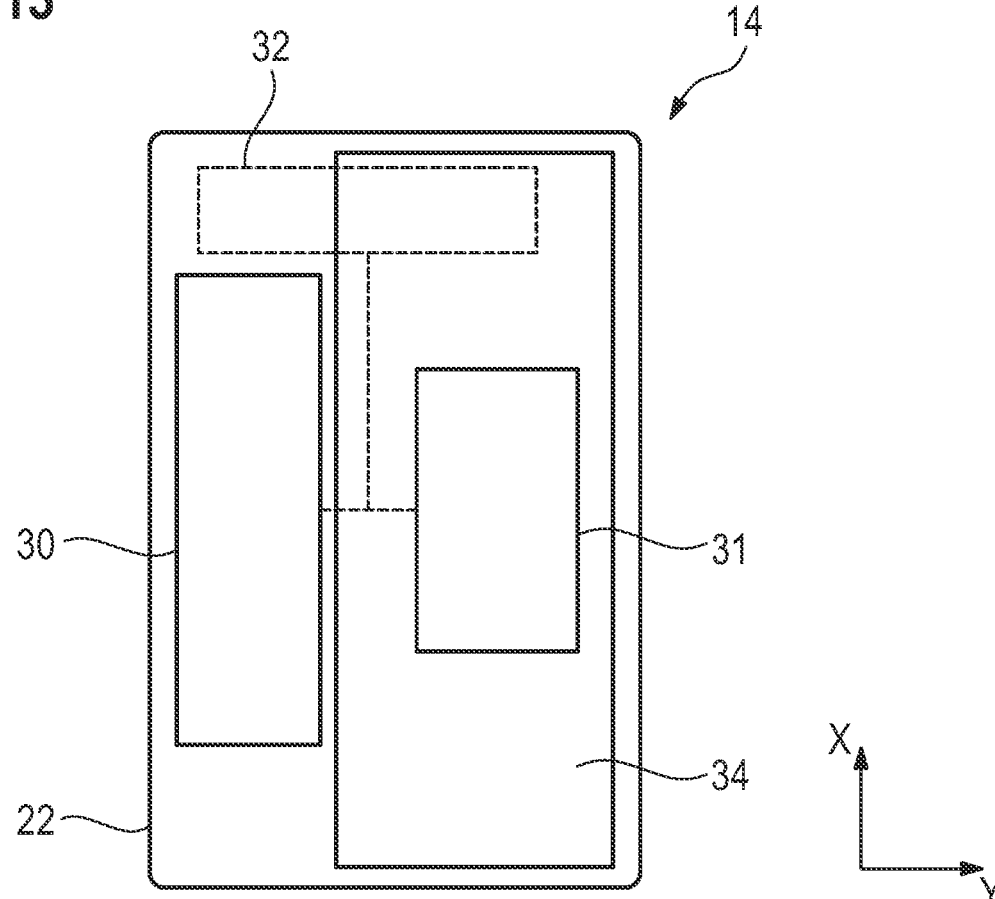
Figure 14:
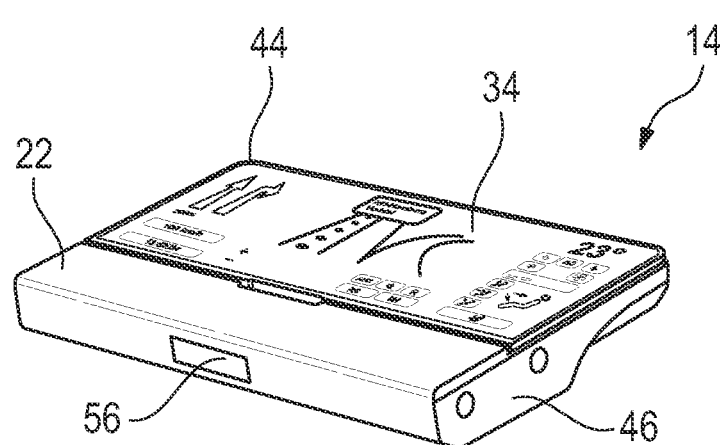
Figure 15:
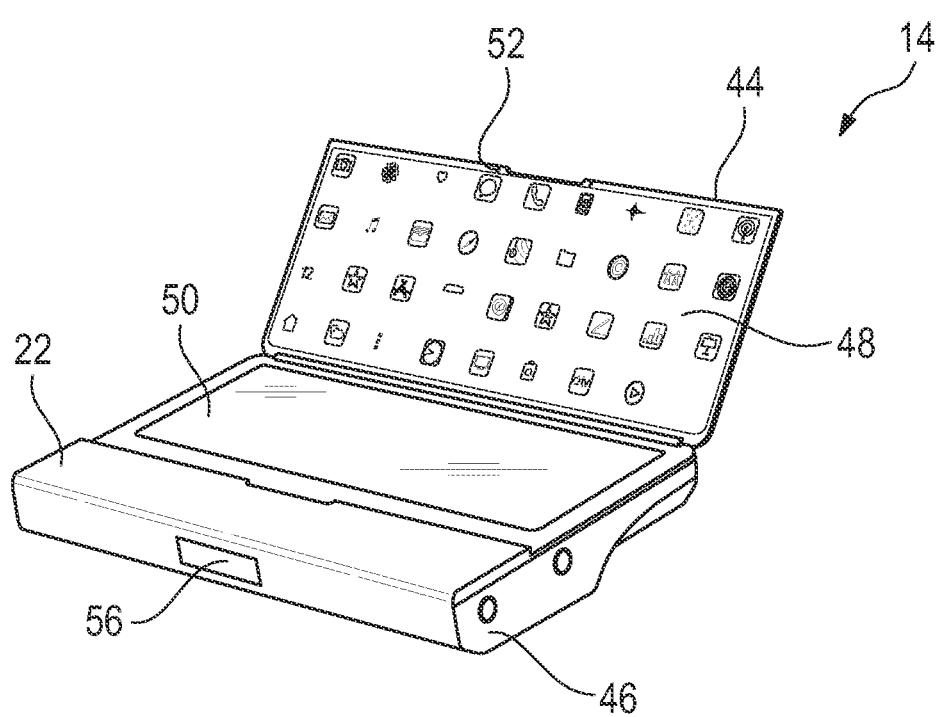
Figure 16:
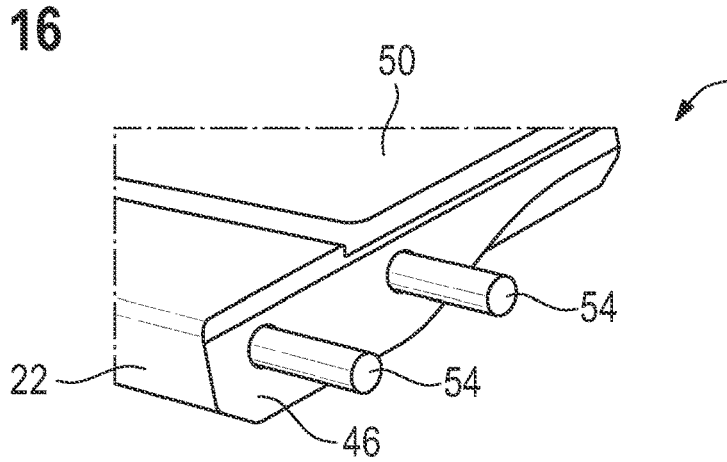
Figure 17:
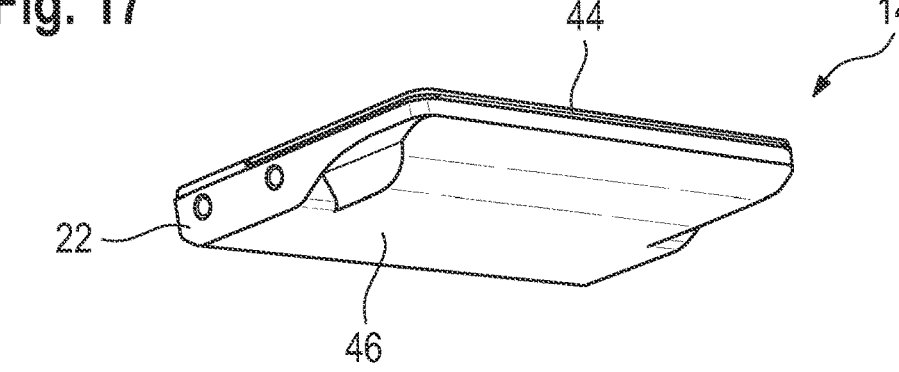
Figure 18:
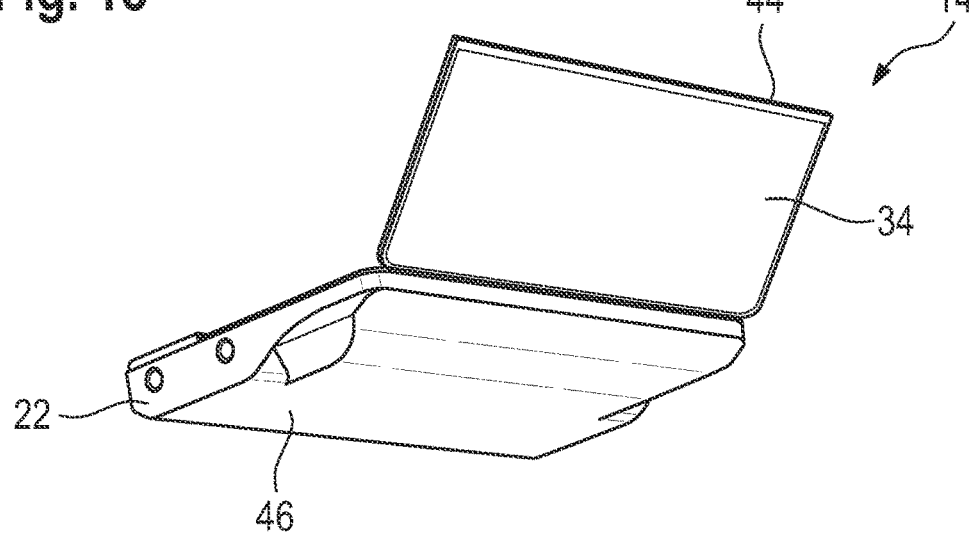
Figure 19:
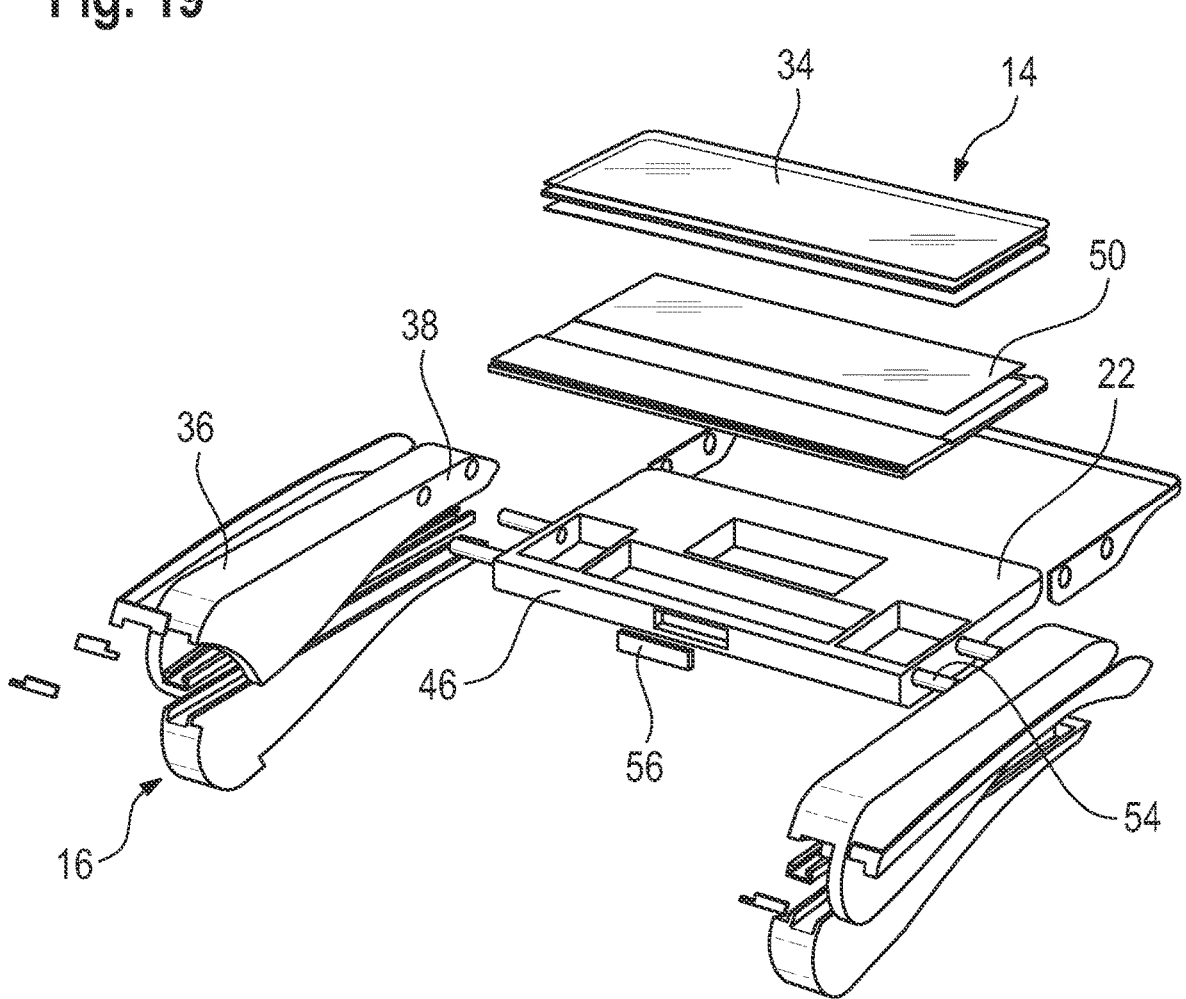
Figure 20:
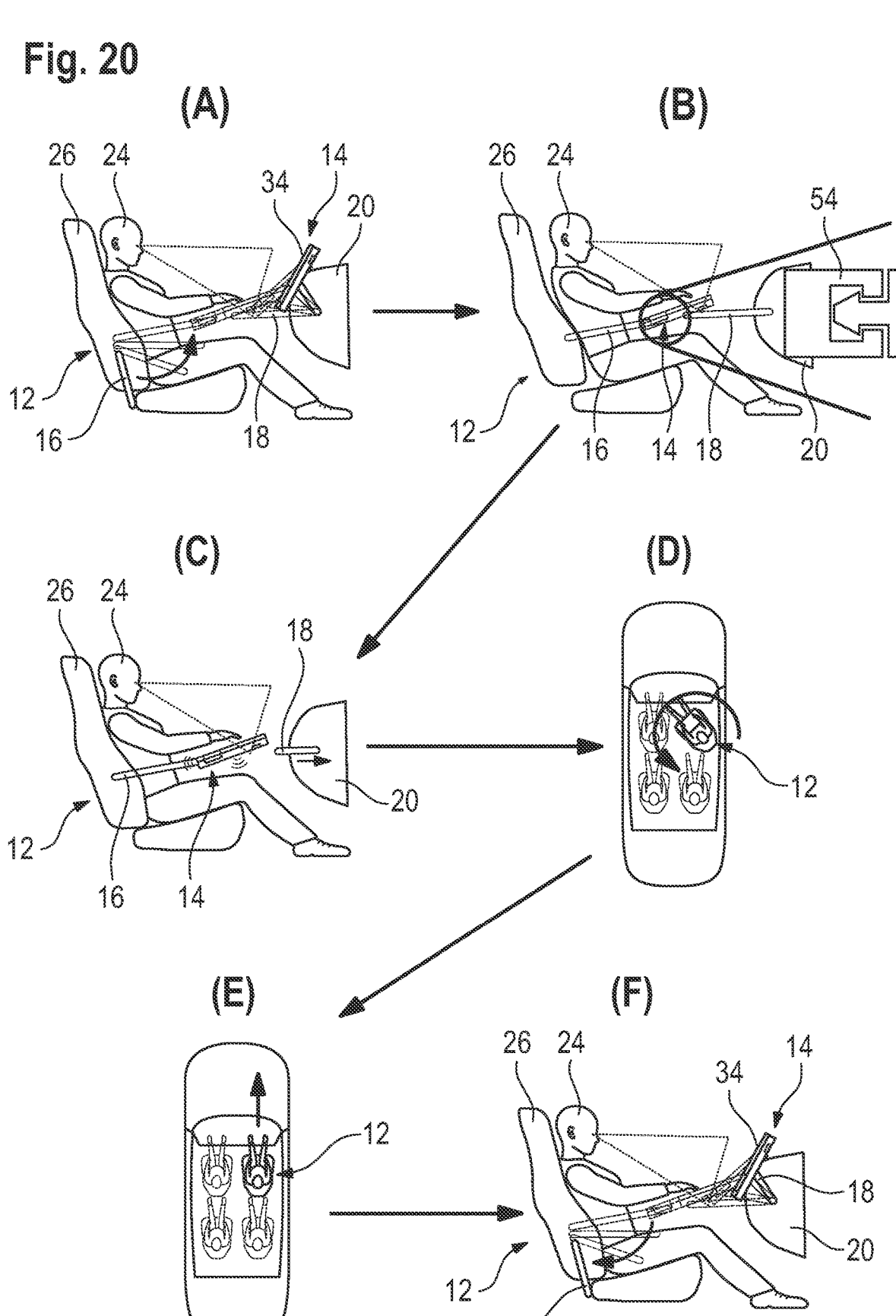
Figures 21, 22:
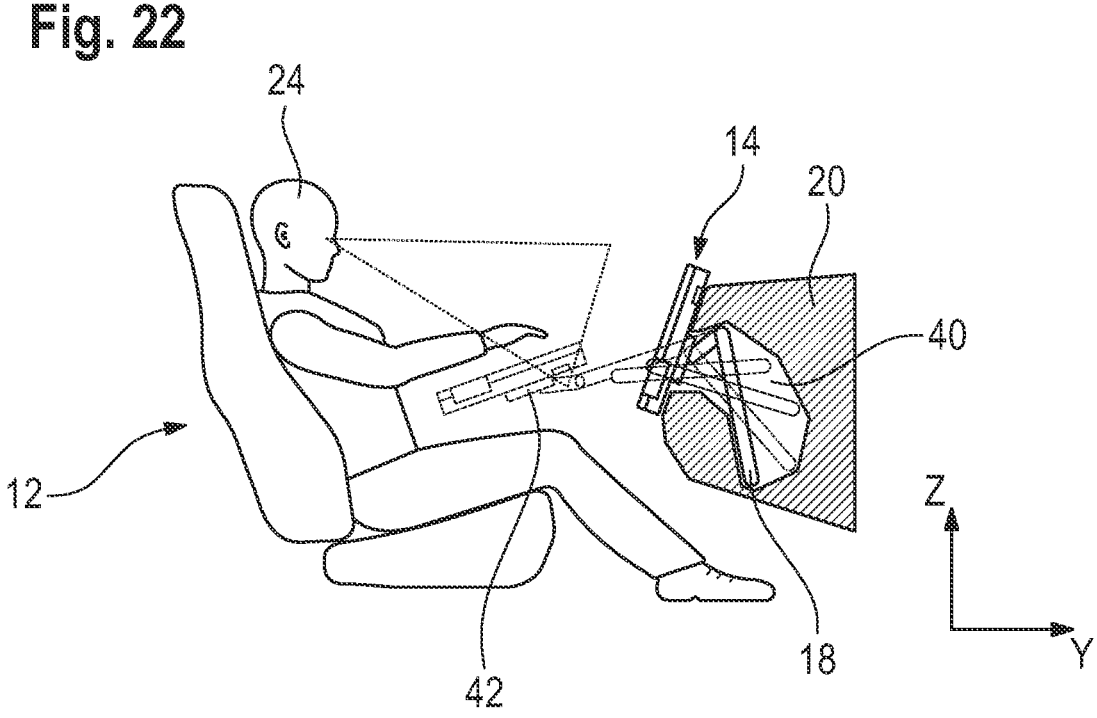
Figure 23:
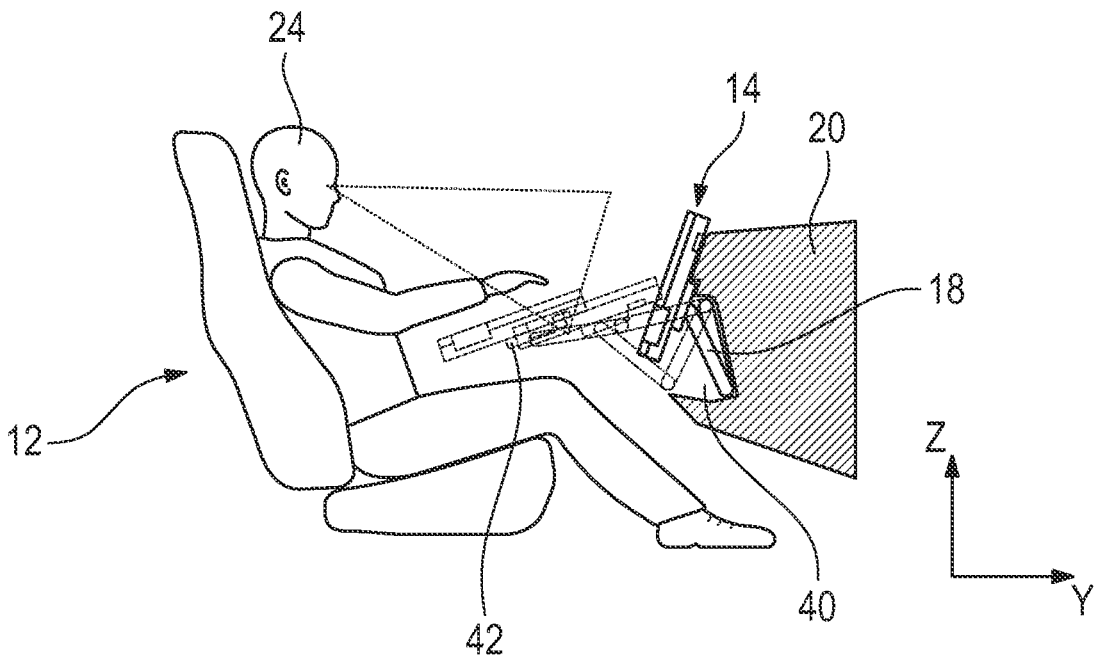

FIG. 3 shows a perspective view of a hinged table system according to the invention installed in a vehicle, FIG. 4 shows a perspective view of a vehicle seat including a passenger module of a hinged table system according to the invention in an operating position when opened, FIG. 5 shows a perspective view of the vehicle seat of FIG. 4 when closed, FIG. 6 shows a lateral view of the vehicle seat of FIG. 4, FIG. 7 shows a lateral view of the vehicle seat of FIG. 4, with the airbags being inflated, FIG. 8 shows a lateral view of a first embodiment of a hinged table system according to the invention in a rest position when closed, FIG. 9 shows a lateral view of a second embodiment of a hinged table system according to the invention in a rest position when opened, FIG. 10 shows a lateral view of a hinged table system according to the invention in the operating position, FIG. 11 shows a lateral view of a hinged table system according to the invention, with a holder being illustrated in the rest position and in a transfer position, FIG. 12 shows a schematic lateral view of a passenger module of a hinged table system according to the invention, FIG. 13 shows a top view of the passenger module of FIG. 12, FIG. 14 shows a front perspective view of a passenger module of a hinged table system according to the invention when closed, FIG. 15 shows a front perspective view of the passenger module of FIG. 14 when opened, FIG. 16 shows a detail view of the passenger module of FIG. 14 including an active locking device, FIG. 17 shows a rear perspective view of the passenger module of FIG. 14, FIG. 18 shows a rear perspective view of the passenger module of FIG. 14 when opened, FIG. 19 is an exploded view of a passenger module and a support device of a hinged table system according to the invention, FIGS. 20A to 20F show the adjusting operation of a hinged table system according to the invention, FIG. 21 shows a lateral view of a second embodiment of a holder of a hinged table system according to the invention, FIG. 22 shows a lateral view of a third embodiment of a holder of a hinged table system according to the invention, and FIG. 23 shows a lateral view of a fourth embodiment of a holder of a hinged table system according to the invention.

DESCRIPTION

Figure 1:
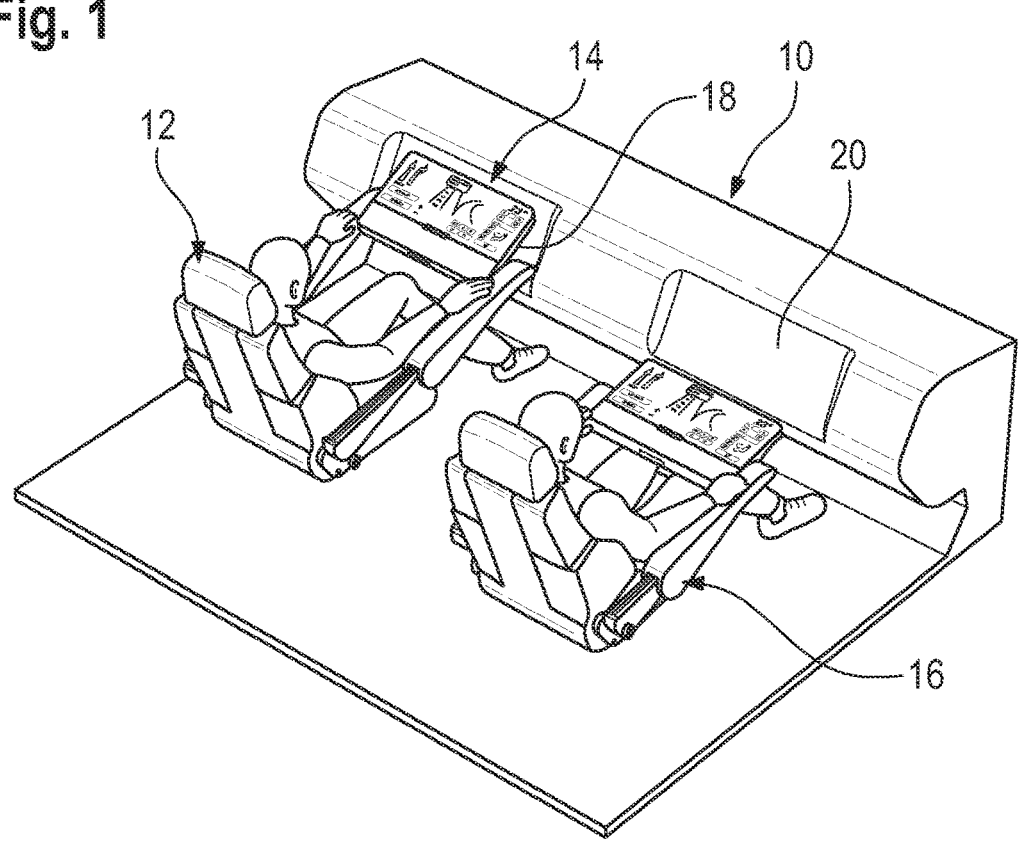
FIG. 1 shows a perspective view of a hinged table system according to the invention.
Figure 2:
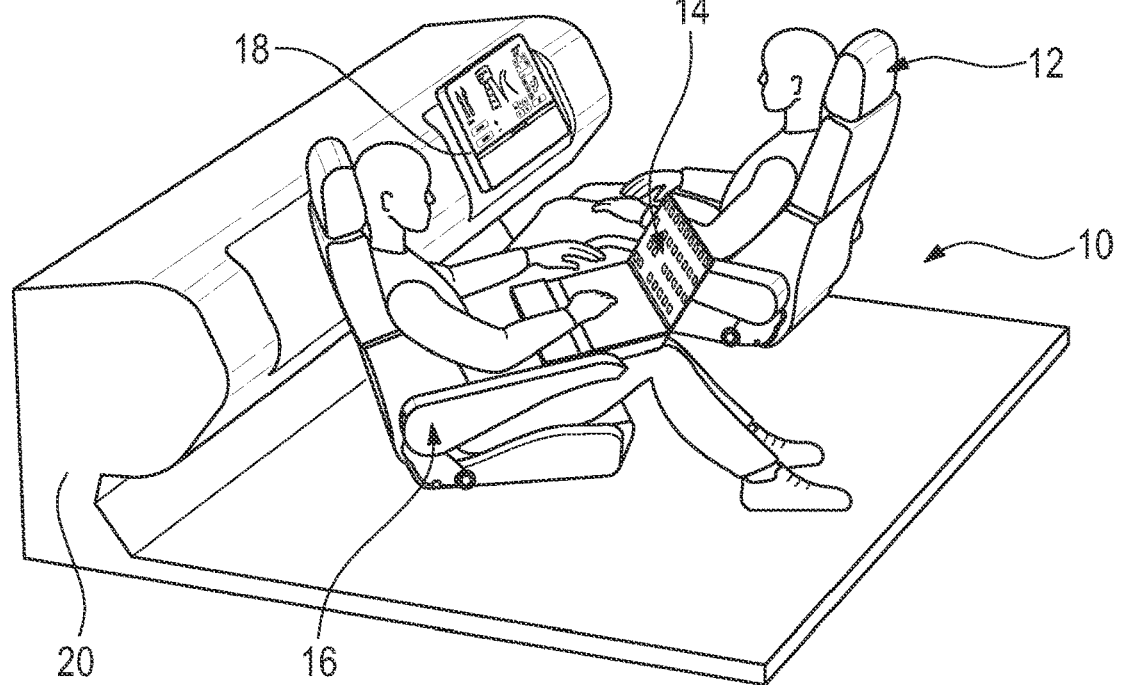
FIG. 2 shows the hinged table system of FIG. 1, with a vehicle seat including a passenger module being rotated.

FIGS. 1 to 3 illustrate a hinged table system 10 for a vehicle seat 12 by which a passenger module 14 can be adjusted using a support device 16 and a holder 18 between a rest position at an instrument panel 20 and an operating position at the vehicle seat 12.

FIGS. 4 to 7 illustrate the passenger module 14 in the operating position. In the operating position, a tabletop 22 of the passenger module 14 extends in front of a vehicle seat occupant 24 so that the upper torso of the vehicle seat occupant 24 is located between the tabletop 22 and a backrest 26 of the vehicle seat 12, and the thighs of the vehicle seat occupant 24 are located between the lower side of the tabletop 22 and a seat base 28 of the vehicle seat 12.

The tabletop 22 can be aligned, in the operating position, substantially horizontally, i.e., in parallel to an X-Y plane, and/or substantially in parallel to the seat base 28 so that the tabletop 22 can be used as a table or tray by the vehicle seat occupant 24 (FIG. 6). It is also possible, however, that the vehicle seat occupant 24 adjusts the tabletop 22 at an angle with the X-Y plane and/or the seat base 28.

In addition, the passenger module 14 in the operating position is aligned so that airbags 30 and 31 which are integrated in the passenger module 14 and can be inflated by at least one inflator 32 serve, when inflated, as restraining elements for the vehicle seat occupant 24. Specifically, a first airbag 30 acts as an impact protection for the head and the upper torso of the vehicle seat occupant 24 and a further airbag 31 acts as a lap restraining element (FIG. 7).

In order to adjust the best possible restraining position of the passenger module 14, the hinged table system 10 can be part of a vehicle occupant protection system which preferably further comprises a control unit and sensor elements to determine a situation of restraint (both not shown). If a situation of restraint or a pre-crash situation is determined by the control unit using the data of the sensor elements, the control unit adjusts the passenger module 14 to the restraining position via the support device. In the restraining position, the passenger module 14 has a distance from the vehicle seat occupant 24, where the best possible protective effect for the occupant restraint can be achieved by the first airbag 30 and the further airbag 31.

In the operating position, the tabletop 22 can be in an opened state or in a closed state.

FIGS. 8 and 9 illustrate the passenger module 14 in the rest position and in the transfer position.

In the rest position, the passenger module 14 is disposed on the instrument panel 20 and is coupled to the holder 18 which is mounted on the instrument panel 20. In so doing, the tabletop 22 is aligned so that the vehicle seat occupant 24 can use an opened multimedia panel 34 as a screen.

In the rest position, the tabletop 22 can be in an opened or closed state.

In the transfer position, the passenger module 14 is aligned so that it can be transferred from the holder 18 to the support device 16, or vice versa.

The support device 16 is arranged laterally on the vehicle seat 12, specifically on the backrest 26, as is visible in FIG. 10.

Accordingly, the support device 16 includes a support arm 36 having a coupling section 38, the support arm 36 being pivotably mounted on the vehicle seat 12. The passenger module 14 can be coupled to the coupling section 38 by the support arm 36.

The support arm 36 has an extendable design and, in the shown embodiment, is a type of telescopic arm.

The support device 16 optionally includes an electric drive (not shown) so that the pivoting and extending movements of the support device 16 can be carried out fully automatically and electrically.

FIG. 11 illustrates the holder 18 in the rest position and in a transfer position. In the transfer position, the passenger module 14 can be coupled to the coupling section 38 on the support arm 36, and the coupling to the holder 18 can be released so that the passenger module 14 can be transferred from the holder 18 to the support arm 36.

In the illustrated embodiment, the holder 18 is designed as an extendable telescopic arm which is mounted in a central portion of a wall in a recess 40 in the instrument panel 20. The holder 18 can be extended substantially linearly and/or in the Y-axis here.

The passenger module 14 is connected to the holder 18 via a coupling element 42, wherein the coupling element 42 is pivotably mounted on the holder 18 so that the passenger module 14, when extended, can be pivoted to the illustrated transfer position.

The holder 18 optionally includes an electric drive (not shown) so that the pivoting and extending movements of the holder 18 can be carried out fully automatically and electrically.

The passenger module 14 is shown in the FIGS. 12 to 19. The passenger module 14 comprises the hinged tabletop 22 which constitutes a type of housing of the passenger module 14 in which a schematically shown inflator 32 and two airbags 30 and 31 are arranged. The number of the airbags 30, 31 may vary. In the shown embodiment, the inflator 32 is in fluid communication with the airbags 30 and 31 so that it can inflate the airbags 30 and 31 (FIGS. 12 and 13).

In the illustrated embodiment, an airbag 31 is arranged in a lower portion and an airbag 30 is arranged in an upper portion of the tabletop 22. The airbag 30 in the upper portion when inflated serves as an impact protection for the head and the upper torso of the vehicle seat occupant 24. The airbag 31 in the lower portion when inflated serves as a lap restraining element (FIGS. 7 and 12).

In further embodiments (not shown), a separate inflator can be associated with each airbag 30, 31. In such embodiment, the passenger module of FIG. 13 would include two inflators 32, wherein a first inflator would be in fluid communication with the first airbag 30 and a second inflator would be in fluid communication with the further airbag 31.

The hinged tabletop 22 comprises a folding element 44 and a base member 46, wherein the folding element 44 can be folded away from the base member 46 by a pivoting movement. In other words, the tabletop 22 can be opened like a laptop (FIGS. 14 and 15).

When closed, the folding element 44 and the base member 46 form a planar unit so that the tabletop 22 can be used as a table or tray (FIG. 14).

The folding element 44 includes a screen surface 48 and the multimedia panel 34, the multimedia panel 34 when closed facing outwards so that it is located in the viewing field of the vehicle seat occupant 24 and can provide the vehicle seat occupant 24 with driving information.

When opened in the operating position, the multimedia panel 34 is deactivated so that energy is saved (FIG. 18). The screen surface 48, on the other hand, is activated when opened in the operating position.

The screen surface 48 is arranged on the side of the folding element 44 opposite to the multimedia panel 34. When closed, the screen surface 48 therefore is not visible for the vehicle seat occupant 24.

By opening, the screen surface 48 and a touchpad 50 formed on the base member 46 are exposed. A keyboard can be projected onto the touchpad 50 for controlling (FIG. 15).

If the passenger module 14 is connected to a computer unit, it can be used like a computer, for example, using the touchpad 50 and the screen surface 48. At the upper edge of the folding element 44, on the side of the screen surface 48 two cameras 52 are arranged so that, for example, a video conference can be attended.

The passenger module 14 includes a locking device 54 by which the passenger module 14 is coupled to the coupling section 38 of the support arm 36 (FIG. 16). The locking device 54 in this case is formed by two locking bolts which are extended through openings on both lateral faces of the tabletop 22 and snap detachably into corresponding openings in the coupling section 38.

In addition, the passenger module 14 includes an emergency release button 56 disposed on the surface of the tabletop 22 which in the operating position is aligned towards the vehicle seat occupant 24 (FIGS. 14 and 15).

The emergency release button 56 releases, when activated, the coupling established by the locking device 54.

In this case, the emergency release button 56 is designed in the signal color red so that, in an emergency case, it can be quickly perceived by the vehicle seat occupant 24. In this case, the activation results in the locking bolts being retracted into the passenger module 14.

The passenger module 14 includes at least two sensors 58, 60 (see FIG. 12) which are arranged to measure the distance of the passenger module 14 from the vehicle seat occupant 24. In particular, a first sensor 58 is arranged to measure the distance between the passenger module 14 and the abdomen of the vehicle seat occupant 24, and a second sensor 60 is arranged to measure the distance between the passenger module 14 and the legs of the vehicle seat occupant 24.

FIG. 20 illustrates the adjusting operation of the passenger module 14 between the rest position and the operating position, the vehicle seat 12 in the rest position being aligned and fixed in the direction of travel.

In the rest position, the passenger module 14 is arranged on the holder 18 and is located remote from the vehicle seat occupant 24 at the instrument panel 20 so that the vehicle seat occupant 24 can use the multimedia panel 34 as a screen. The support device 16 is arranged laterally on the vehicle seat 12 and points downwards with the coupling section 38 towards the vehicle floor (FIG. 20A).

If the adjusting operation is activated, the holder 18 moves with the passenger module 14 away from the instrument panel 20 and pivots the passenger module 14 into the transfer position. At the same time, the support arm 36 of the support device 16 swivels upwards by about 90° and with the coupling section 38 is extended towards the passenger module 14.

Subsequently, the passenger module 14 is aligned toward the coupling portion 38 so that the locking device 54 can establish a coupling between the passenger module 14 and the coupling section 38. Thus, the passenger module 14 is connected to the support arm 36 of the support device 16 and to the holder 18 (FIG. 20B).

Moreover, in FIG. 20B, a second embodiment of a locking device 54 is shown in which the locking bolt and the corresponding opening include an undercut.

After that, the coupling between the passenger module 14 and the holder 18 is released and the holder 18 returns to the instrument panel 20 into the rest position.

In the next step, the two sensors measure the distance between the passenger module 14 and the vehicle seat occupant 24, specifically the distance from the legs and the abdomen of the vehicle seat occupant 24 (FIG. 20C).

The measured distance helps determine an ideal position for the passenger module 14 relative to the vehicle seat occupant 24 to which it is subsequently adjusted by the support device 16 so that the passenger module 14 is in the operating position.

The vehicle seat 12 is released and thus can be rotated to a desired position. In this way, e.g. a vehicle seat 12 in a front seat row can be aligned with a viewing direction towards a rear seat row (FIG. 20D).

Before ending the travel, the vehicle seat 12 is rotated to its initial position again and is fixed (FIG. 20E).

The holder 18 then moves from the instrument panel 20 to the passenger module 14. Subsequently, the passenger module 14 is aligned toward the holder 18 and a coupling is established between the holder 18 and the passenger module

14 so that the passenger module 14 is connected both to the support device 16 and to the holder 18.

Then the coupling between the support device 16 and the passenger module 14 is released and the support device 16 is moved back to the rest position. At the same time, the holder 18 moves with the passenger module 14 to the instrument panel 20 and pivots the passenger module 14 into the rest position (FIG. 20F).

FIG. 21 illustrates a second embodiment of the holder 18. For the components known from the first embodiment, the same reference numerals are used and, in this respect, the above explanations are referred to.

The basic principle of the holder according to the second embodiment corresponds to that of the first embodiment. Therefore, only the differences shall be explained in the following.

The holder in FIG. 21 is designed as a pivotable telescopic arm and is mounted in a lower portion of the wall in the recess 40.

In the rest position, the holder 18 is therefore pivoted upwards so that the coupling element 42 is aligned approximately at a 90° angle with a longitudinal axis of the telescopic arm and the passenger module 14 is adjacent to the instrument panel 20.

FIG. 22 illustrates a third embodiment of the holder 18. For the components known from the first embodiment, the same reference numerals are used and, in this respect, the above explanations are referred to.

The basic principle of the holder according to the third embodiment corresponds to that of the first embodiment. Therefore, only the differences shall be explained in the following.

In this embodiment, the holder 18 is designed a lever arm which can adjust the passenger module 14 between the rest position and the transfer position by a lever movement.

The recess 40 in the instrument panel 20 is appropriately adapted to the movement of the holder 18 and is increased.

In FIG. 23, a fourth embodiment of the holder 18 is shown. For the components known from the first embodiment, the same reference numerals are used and, in this respect, the above explanations are referred to.

The basic principle of the holder according to the fourth embodiment corresponds to that of the first embodiment. Therefore, only the differences shall be explained in the following.

In this case, the holder 18 is designed as a type of scissor arm which can adjust the passenger module 14 between the rest position and the transfer position by a scissor movement.

In this case, too, the recess 40 in the instrument panel 20 is adapted to the holder 18 so that the scissor movement can be carried out correctly.

The invention claimed is:

1. A hinged table system for a vehicle seat, comprising an adjustable holder arranged on an instrument panel, a support device mounted on the vehicle seat, and comprising a passenger module which comprises at least an airbag and a tabletop including a multimedia panel, wherein the airbag is in fluid communication with an inflator so that the inflator can inflate the airbag, and wherein the passenger module is coupled, in a rest position, to the holder on the instrument panel, and the support device on the vehicle seat includes a support arm having a coupling section to which the passenger module can be coupled, wherein the passenger module can be adjusted between a rest position at the instrument panel and an operating position at the vehicle seat.

2. The hinged table system according to claim 1, wherein a drive is provided for fully automatically transferring the passenger module from the holder to the support device, and vice versa.

3. The hinged table system according to claim 1, wherein the holder includes an extendable telescopic arm by which the passenger module can be transferred to the support device.

4. The hinged table system according to claim 1, characterized in thatwherein the holder includes an adjustable lever or scissor arm by which the passenger module can be transferred to the support device.

5. The hinged table system according to claim 1, wherein the passenger module can be releasably coupled to the coupling section via a locking device.

6. The hinged table system according to claim 5, wherein the passenger module includes an emergency release button which, when activated, releases the coupling established by the locking device.

7. The hinged table system according to claim 1, wherein the support device is pivotably mounted on the vehicle seat and/or the support arm is designed to be extendable.

8. The hinged table system according to claim 1, wherein the passenger module includes at least two sensor which can measure the distance of the passenger module from a vehicle seat occupant.

9. The hinged table system according to claim 1, wherein the tabletop of the passenger module is designed to be hinged, wherein the tabletop is in an opened or a closed state in the rest position and the multimedia panel is arranged so that it can be used as a screen by the vehicle seat occupant.

10. The hinged table system according to claim 1, wherein the hinged table system includes a drive so that the holder and the support device can be adjusted and aligned with each other fully automatically or semi-automatically.

11. A method of positioning a passenger module of a hinged table system according to claim 1 comprising the steps of:

moving the holder with the passenger module coupled thereto from the rest position at the instrument panel toward the vehicle seat, coupling the passenger module to the coupling section of the support arm so that the passenger module is coupled to the support arm and to the holder, and releasing the coupling with the holder and returning the holder to the instrument panel.

12. The method according to claim 11, comprising the further steps of:

measuring the distance of the passenger module from a vehicle seat occupant via at least two sensors, a first sensor determining the distance from the legs and a second sensor determining the distance from the abdomen of the vehicle seat occupant, and determining a preferred position of the passenger module based on the distance values measured and adjusting the passenger module to said position.

13. The method according to claim 11, comprising the further steps of:

moving the holder from the instrument panel to the passenger module, coupling the holder to the passenger module and releasing the coupling with the support arm, and moving the holder including the passenger module coupled thereto from the operating position at the vehicle seat to the rest position and pivoting the support arm from the operating position to the rest position.

14. A vehicle occupant protection system comprising a hinged table system according to claim 1 as well as a control unit and sensor elements for detecting situations of restraint, wherein the control unit is signal-connected at least to the inflator and to the sensor elements, wherein the control unit and the sensor elements are suited for detecting a pre-crash situation and, if such a pre-crash situation is given, the control unit adjusts the passenger module by adjusting the support device from the operating position to a restraining position provided for restraining the vehicle seat occupant, in particular wherein the distance of the passenger module from the vehicle seat occupant is determined to establish the restraining position using the sensors of the passenger module.

* * * * *